Patented Aug. 25, 1953

2,650,152

UNITED STATES PATENT OFFICE 2,650,152

PRINTING ASSISTANTS FOR VAT COLORS COMPRISING ZIRCONIUM SALTS

Jerry M. Mecco, Somerville, N. J., assignor to American Cyanamid Company, New York, N. Y., a corporation of Maine No Drawing. Application July 21, 1951, Serial No. 238,019

15 Claims. (Cl. 8—70)

This invention relates to printing assistants for vat dyes and methods of printing therewith.

Vat dyes are usually printed from a printing paste containing a carbohydrate thickener, alkali reducing agent, and the vat dye or dyes. The printed material is usually aged at higher temperatures in order to reduce the dye and permit it to unite with the fiber, followed by oxidation. Sometimes the printed fabrics can not be aged immediately after printing and drying. If they are stored for a period in a humid atmosphere, inferior strength and light fastness result, the disadvantages being particularly striking with certain desirable vat dyes of the anthraquinone thiazole and thio-indigo type. As many of these sensitive dyes are of great practical importance, the problem of satisfactory printing has been a serious one.

The present invention is directed to a printing assistant and to processes and compositions using it which result in improved strength of the prints even when stored in a humid atmosphere before aging. The printing assistant is a zirconium salt such as zirconium oxychloride, tetrachloride and the like. The mechanism by which the printing assistant operates is not fully understood and the invention is not intended to be limited to any explanation or mechanism. However, it is definitely known that it is the zirconium rather than the particular anion which exerts the printing assisting effect. The anion, unless of a type which would react with vat dyes, is more or less immaterial.

The amount of zirconium compound is not critical but for best results will vary from about one-sixth to five times the weight of the dye. It is not definitely known to what extent the effect is catalytic but the amounts required for best results indicate that at least part of the action of the assistant is as a chemical reactant. Improvements are noted even at the lower part of the range for preferred results, printing strength increases to a point near the upper end of the range and then ceases to increase sufficiently to make larger amounts of the assistant worthwhile. It is an advantage of the invention that the particular point of addition of printing assistant is not critical. It may be mixed with a stock thickener to which the dye is then added to make up the final printing paste or it may be incorporated in the printing paste at the time it is prepared. It is often desirable to market dye pastes containing the printing assistant so that they can be made up into printing pastes with standard thickeners. The printing assistants of the present invention lend themselves to incorporation with dye pastes and when so incorporated show good keeping qualities. There is no deleterious effect on the physical characteristics of the printing paste itself and normal printing technique may be used.

The invention will be described in greater detail in conjunction with the following specific examples, all parts being by weight unless otherwise noted.

EXAMPLE 1

Thickener A

A printing thickener was prepared by slurrying 1,422 parts of pearl cornstarch and 1,703 parts of British gum in 2,400 parts of cold water, after which the mixture was heated with continuous stirring until the temperature reached about 185° F. 1,094 parts of powdered sodium carbonate and 250 parts (by volume) of turpentine were then added. Heating and stirring were continued for about 2½ hours until the carbonate had dissolved and the paste was smooth. Heating was discontinued, and 1,094 parts of potassium carbonate were then added and stirring continued with cooling for one-half hour until the potassium carbonate was dissolved. Stirring was continued until the temperature had reached about 90° F., after which 1,700 parts of sodium formaldehyde sulfoxylate, which had been dissolved in 1,700 parts of water, were added slowly, after which the stirring was continued for about one hour until the paste was fairly smooth. 1,250 parts (by volume) of glycerine were then stirred thoroughly into the paste which was then diluted with water to bulk to five gallons.

EXAMPLE 2

Thickener B 1,152 parts of British gum and 1,152 parts of a low converted corn dextrine, i. e., less than 10% dextrinized, were slurried in 7,600 parts of cold water and the mixture heated with continuous stirring until the temperature reached about 185° F. Heating and stirring were continued for about 2 hours, after which 200 parts (by volume) of turpentine were added and stirred for a half hour. 1,900 parts of potassium carbonate, dissolved in 2,000 parts of water, were then added. Heating was discontinued but stirring continued until the paste had cooled to 130° F., after which 2,496 parts of sodium formaldehyde sulfoxylate dissolved in 2,496 parts of water were added slowly and stirred for about one hour until the paste was smooth, after which 240 parts (by volume)

glycerine were added and stirring continued for about 15 hours. The material was then bulked to make about four gallons.

EXAMPLE 3

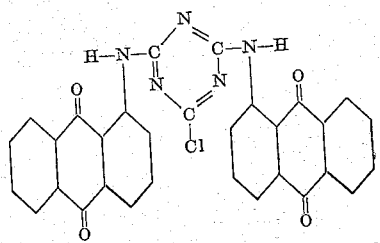

10 parts of a dye paste of the dyestuff of the above formula were mixed with 90 parts of Thickener A. This is a control printing paste containing about 1.1% of real dye.

A second printing color paste was prepared as above except only 85 parts of Thickener A were used and 5 parts of an ammonium zirconyl carbonate liquor containing about 7.6% Zr were added.

Prints from these two printing color pastes were made on bleached unmercerized 80 x 80 cotton print cloth, dried, aged under commercial aging conditions, oxidized in a dilute solution of chrome and acetic acid at 130° F., rinsed, soaped in a 0.1% soap solution at the boil for about 5 minutes, again rinsed and finally dried.

The color value of the print made from the paste containing the zirconium compound was about 125% when compared to 100% for the control.

EXAMPLE 4

A portion of each of the dried printed pieces in Example 3 was stored, before aging, for 18 hours in a desiccator having 80% relative humidity. When these pieces were aged and developed, the print made from the paste containing the zirconium compound was very much stronger than the control.

EXAMPLE 5

Pieces of the printing material of Example 3 were also stored for 18 hours in a desiccator containing 100% relative humidity before aging and developing, and the difference in color value was more marked than the difference at 80% indicated in Example 4.

EXAMPLE 6

The procedure of Example 3 was repeated except 5 parts of zirconium tetrachloride (about 100% material) were used in place of the 5 parts of ammonium zirconyl carbonate liquor used in Example 3. The results were generally the same as in Example 3.

EXAMPLE 7

The procedure of Example 3 was repeated except 5 parts of milled zirconium silicate were used. The color value of the print made from the paste containing the milled zirconium silicate was stronger and greener than that of the print made from the control paste.

EXAMPLE 8

Nine parts of zirconium oxychloride and 14 parts of 30° Bé. sodium hydroxide were added to 90 parts of the dye paste of Example 3, making a total of 113 parts.

12½ parts of this dye-zirconium oxychloride-sodium hydroxide composition (equivalent to 10 parts of the commercial color paste) were made up to 100 parts with Thickener A and tested against a control sample using the printing and developing procedure of Example 3 on the bleached unmercerized 80 x 80 cotton print cloth. The color of the print made from the paste containing the zirconium oxychloride was stronger and brighter than the control sample.

When stored in relative humidities of 80% or 100% for 18 hours before aging and developing, the improvement due to the presence of the zirconium compound is pronounced.

EXAMPLE 9

The following print color pastes were prepared.
A. Ten parts of the dye of Example 3 and 90 parts of Thickener A. This is a control.
B. Like "A" except one part of the thickener was replaced with one gram of zirconium tetrachloride.
C. Like "A" except two parts of the thickener were replaced with two parts of zirconium tetrachloride.
D. Like "A" except three parts of the thickener were replaced with three parts of zirconium tetrachloride.
E. Like "A" except four parts of the thickener were replaced with four parts of zirconium tetrachloride.
F. Like "A" except five parts of the thickener were replaced with five parts of zirconium tetrachloride.

These six pastes were printed on bleached unmercerized 80 x 80 cotton print cloth and spun rayon, and finished as in Example 3.

There was a definite increase in the color value of the prints B through F, the latter being the strongest and the brightest of the series.

Prints made from the six pastes were stored, after air drying but before aging, in atmospheres of 80% and 100% relative humidity for 18 hours, after which they were aged and developed and finished as in Example 3. The improvement in color value as compared to the control print was particularly noticeable in these prints which have been subjected to moist storage conditions before aging and finishing.

EXAMPLE 10

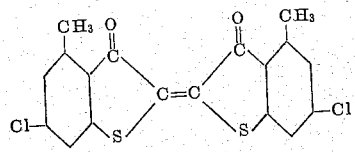

A press cake of the dyestuff of the above formula was deflocculated with a sodium salt of di-sulfo-dinaphthyl methane and then passed through a colloid mill to give a smooth, uniform suspension. After determining the dye content of this material, a weighed quantity containing about 1.5 parts real dye was made up to 100 parts with Thickener A. This was the control.

Additions of zirconium oxychloride were made as in the preceding example except that the amounts added were different as noted below:
A. Control (no addition).
B. 0.25 part of Thickener A were replaced with 0.25 part of zirconium oxychloride.
C. 0.5 part of Thickener A were replaced with 0.5 part of zirconium oxychloride.
D. 1.0 part of Thickener A were replaced with 1.0 part of zirconium oxychloride.
E. 2.0 parts of Thickener A were replaced with 2.0 parts of zirconium oxychloride.

F. 3.0 parts of Thickener A were replaced with 3.0 parts of zirconium oxychloride.

These pastes were struck off on cotton and rayon fabrics and finished as in Example 3. The color value of the stripe made from the paste containing 3.0 parts of zirconium oxychloride gave the best color yield and brightest print. There was a steady improvement over the control from stripe B through stripe F.

EXAMPLE 11

The procedure of the preceding example was repeated using Thickener B and the prints were made on rayon. The results were similar to those obtained in Example 10.

EXAMPLE 12

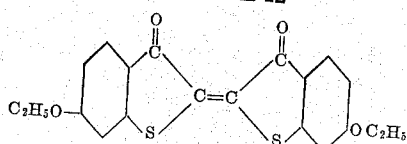

The procedure of the preceding examples was repeated except the color of the above formula was used, and the amount of the real dye present was about 1.2 g.

The addition of the varying amounts of zirconium oxychloride resulted in a gradual increase in color value and brightness of shade, the maximum being obtained when three parts of the zirconium oxychloride were added to Thickener B.

EXAMPLE 13

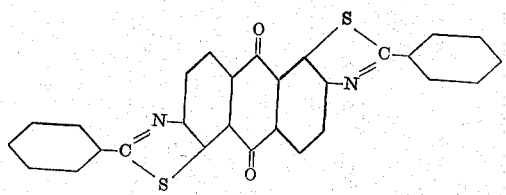

The procedure of Example 8 was repeated except the color of the above formula was used.

The print made from the paste containing the zirconium oxychloride was stronger than the control sample.

EXAMPLE 14

The procedure of the preceding example was repeated but the prints after drying and before aging were stored in a high humidity atmosphere for 18 hours before they were aged. Here the effect of the zirconium compound on the color value of the print was particularly noticeable causing a good strong print to be obtained while the control gave only a very weak print.

I claim:

1. A vat dye composition comprising a vat dye and an effective amount of a zirconium salt.
2. A composition according to claim 1 in which the weight of the zirconium compound is from one-sixth to five times the weight of the vat dyestuff.
3. A composition according to claim 1 in which the vat dye is of the thioindigo series.
4. A composition according to claim 1 in which the vat dye is an anthraquinone thiazole color.
5. A composition according to claim 1 in which the vat dyestuff is an anthraquinonyl amino triazine.
6. A vat dye printing paste comprising in combination carbohydrate thickener, a strong alkali, a vat dye reducing agent, a vat dye and an effective amount of a zirconium salt.
7. A vat dye printing paste according to claim 6 in which the weight of the zirconium compound is from one-sixth to five times the weight of the vat dyestuff.
8. A paste according to claim 6 in which the vat dye is thioindigo.
9. A paste according to claim 6 in which the vat dye is an anthraquinone thiazole color.
10. A paste according to claim 6 in which the vat dye is an anthraquinonyl amino triazine.
11. A process of printing which comprises applying to a textile fabric a printing paste comprising in combination carbohydrate thickener, a strong alkali, a vat dye reducing agent, a vat dye and an effective amount of a zirconium salt, in the form of a design, subjecting the printed fabric to a treatment selected from the group consisting of hot aging and damp storage and oxidizing the printed design to fix the vat dyestuff in its oxidized form.
12. A process according to claim 11 in which the amount of the zirconium compound is from one-sixth to five times the weight of the vat dyestuff.
13. A method according to claim 11 in which the dyestuff is thioindigo.
14. A method according to claim 11 in which the dyestuff is an anthraquinone thiazole color.
15. A method according to claim 11 in which the dyestuff is an anthraquinonyl amino triazine.

JERRY M. MECCO.

References Cited in the file of this patent

UNITED STATES PATENTS

| Number | Name | Date |
|---|---|---|
| 1,945,484 | Hagenbocker | Jan. 30, 1934 |
| 2,405,151 | Kienle | Aug. 6, 1946 |